United States Patent [19]

Danielsen

[11] 3,838,227

[45] Sept. 24, 1974

[54] SWITCHING NETWORK CONTROL CIRCUIT

[75] Inventor: Daniel Danielsen, Wheaton, Ill.

[73] Assignee: Bell Telephone Laboratories, Murray Hill, N.J.

[22] Filed: June 11, 1973

[21] Appl. No.: 368,613

[52] U.S. Cl. .......................... 179/18 GF, 340/166 S

[51] Int. Cl. .......................................... H04m 3/00

[58] Field of Search ........ 179/18 GE, 18 GF, 1 SW; 307/253, 252 A, 252 B; 335/151, 155, 159, 162; 340/166 S

[56] References Cited

UNITED STATES PATENTS 3,251,036 5/1966 Smith ............................ 179/18 GF

*Primary Examiner*—Kathleen H. Claffy
*Assistant Examiner*—Gerald L. Brigance
*Attorney, Agent, or Firm*—Richard B. Havill

[57] ABSTRACT

In one selection arrangement for a differentially wound ferreed network, a PNPN transistor gate is employed to select particular switches of a network grid. In the past, the gates have been serially enabled to define a pulse path. Here an individual path to ground for selection control currents is provided through a resistor connected in the cathode circuit of the transistor. Enabling of a selected transistor is made independent of a preceding or succeeding transistor in the pulse path and the integrity of said path may be advantageously verified by monitoring the magnitudes of the control and path sensing currents supplied to the selected transistors.

15 Claims, 3 Drawing Figures

PATENTED SEP 24 1974 3,838,227

SHEET 2 OF 2

SWITCHING NETWORK CONTROL CIRCUIT

BACKGROUND OF THE INVENTION

This invention is concerned generally with communication switching networks and more particularly with circuits for selectively controlling the completion of transmission paths through such networks.

Although electronic circuits have replaced a large number of metallic contact control arrangements in many telephone switching systems, mechanically operating relays still play an important roll in accomplishing various control functions. Factors such as the need for size and cost reduction, life extension, and the adaptability for circuit integration, to name a few, however, continue to force a diminishing of that role with more and more solid state devices replacing what relays remain. This is also the case in connection with the control of the selection of transmission paths through the switching network. With the introduction of substantially smaller, high performance, sealed reed crosspoint switches, the telephone switching network may well constitute the last circuit application in which metallic contact switches are advantageously employed. The use of more efficient and smaller crosspoint switches, however, demands a corresponding improvement in the circuitry for controlling their selective operation, which circuitry in particular arrangements has in the past included a number of relays.

The manner of providing electronic circuits for performing functions previously performed by relays is known and specific arrangements are readily devised by one skilled in the art. One important function, — that of providing electrical isolation for network crosspoint control plants, — is readily accomplished, for example, by suitably including unilateral conducting elements in the paths. Such elements themselves, however, provide less positive isolation than their relay counterparts in that they are subject to current leakage or even actual shorted conditions. Either of these conditions in one or more diodes may serve to establish multiple and interfering conducting paths or even destroy an established path in the transmission network. Unwanted conducting paths may, of course, also be created by shorts elsewhere in the network or by system addressing error. Manifestly, unless these network conditions are immediately detected, the ability of the telephone system to provide rapid and reliable service may be seriously impeded. Accordingly, a general object of this invention is the detection of multiple conducting control paths in a telephone switching system as they occur.

SUMMARY OF THE INVENTION

The foregoing and other objects of this invention are realized in one illustrative embodiment thereof comprising a transmission path selection arrangement advantageously adapted for use in association with a switching network employing differentially wound reed switches of the character described, for example, in the patent of A. L. Blaha et al., U.S. Pat. No. 3,075,059, issued Jan. 22, 1963. In the present network arrangement, a single PNPN transistor, for example, has its anode connected via individual diodes to each of the input selection conductors of a switch. Its cathode is connected to each of the output selection conductors. The switch is selected by energizing the gate electrode of its PNPN transistor to conduct current through a particular horizontal and vertical conductor. The reed switch connected to the latter conductors at their crosspoint is thus activated by the concurrent energization of its coordinate windings to close its transmission path contacts. Selection of the particular input and output conductor is accomplished at a preceding and succeeding switch stage, respectively. Obviously, were any diode or diodes of other conducting paths shorted or leaky, current would find these to activate unselected crosspoint switches and thereby create unwanted transmission paths or destroy already established paths.

Detection of an unwanted path or paths is accomplished in accordance with the present invention by the establishment of an individual conductive path for a control signal used to energize a selected PNPN transistor. This is accomplished by connecting the cathode terminal of each PNPN transistor through a resistor to a suitable source of potential, e.g., ground. A potential applied to the gate electrode of a PNPN transistor and the value of the resistor in the transistor's cathode circuit determine the magnitude of the gating current. Unless a diode in an unselected path is leaky or shorted, or an addressing error causes more than one PNPN transistor to be switched on, in the same stage of selection, the gating current will see only the cathode resistor of the selected PNPN. If, however, there is a fault in the network, then one or more resistors will be placed in parallel with the said cathode resistor. The magnitude of the gating current, in such a situation, will deviate from the predetermined level and in so doing, indicate to the system that there may be a fault in the selected path. No attempt would in that case be made to pulse the selected path and corrective maintenance steps may be initiated.

It is thus one feature of this invention that a resistor is added between the cathode of each PNPN transistor of a control circuit and suitable potential source with the result that each transistor can be individually and selectively energized.

It is another feature of this invention that the magnitude of the gating current used to switch on a selected PNPN transistor of a control circuit at the same time verifies isolation of the selected path from the unselected ones.

BRIEF DESCRIPTION OF THE DRAWING

The foregoing and other objects and features of this invention will be better understood from a consideration of the detailed description of an illustrative embodiment thereof which follows when taken in conjunction with the accompanying drawing in which.

DETAILED DESCRIPTION

Figure 1:
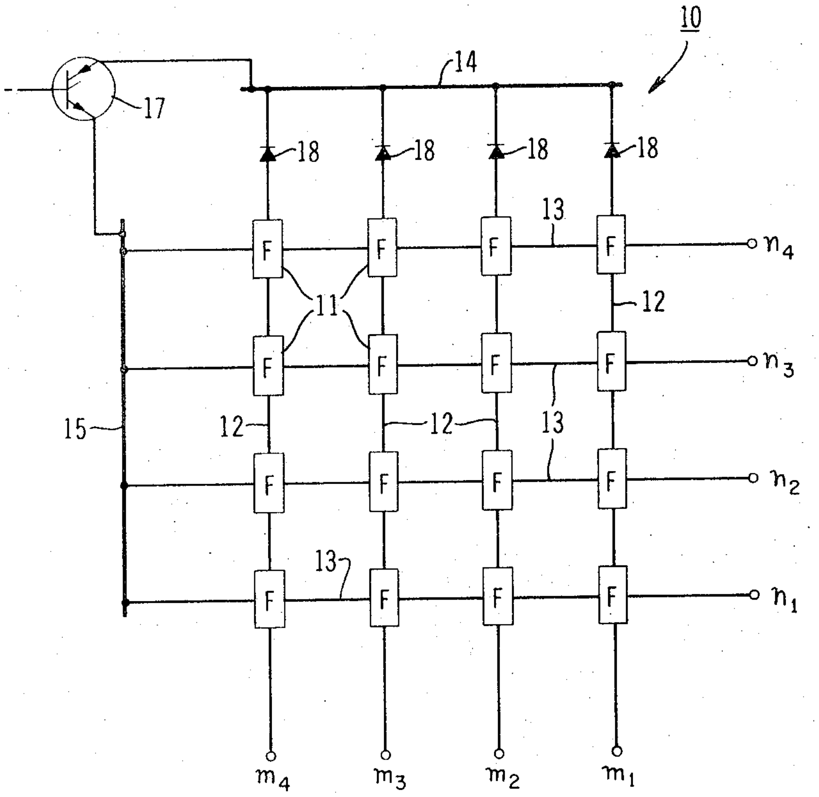
FIG. 1 PRIOR ART
FIG. 1 depicts a typical prior art ferreed crosspoint switch included to demonstrate the problems to which the present invention is directed.

A basic prior art switching arrangement for establishing transmission paths through a network of the character with which a control circuit according to this invention is adapted for use is shown in FIG. 1 and comprises a coordinate array switch 10 having a differentially wound ferreed device 11 at each of its crosspoints. Although switch 10 is shown as comprising a 4 × 4 array, clearly any capacity switch could be utilized with this invention. The switch 10 is substantially of the character described in the W. Keister U.S. Pat. No. 3,110,722 issued Feb. 8, 1966. The *m* and *n* coordinates of the switch 10 are defined by the sets of coordinate control conductors 12 and 13 each of which serially includes corresponding ones of the control windings of the ferreeds 11. The output ends of coordinate control conductors *m* are connected through isolating diodes 18 to one common conducting bus 14 and the input ends of the coordinate control conductors *n* are connected to another common bus 15. A gating means, such as, for example, a PNPN transistor 17 is connected between bus 14 and bus 15, its anode being connected to bus 14 and its cathode being connected to bus 15. Conducting paths may be traced from any input control terminal $m_1$ through $m_4$ of the *m* coordinate control conductors via diodes 18, conducting bus 14, PNPN transistor 17, and conducting bus 15 provided the PNPN transistor 17 is enabled. If the PNPN transistor 17 is not enabled, the control terminals $m_1$ through $m_4$ and $n_1$ through $n_4$, and thus the two control windings sets of each of the ferreeds 11, will obviously be electrically isolated. The individual ferreeds 11 of the switch 10, which are shown in block symbol form in FIG. 1, may advantageously take the form of the differentially wound ferreed device shown in simplified form in FIG. 2, and described in detail in the Blaha et al. patent mentioned hereinbefore.

Figure 2:
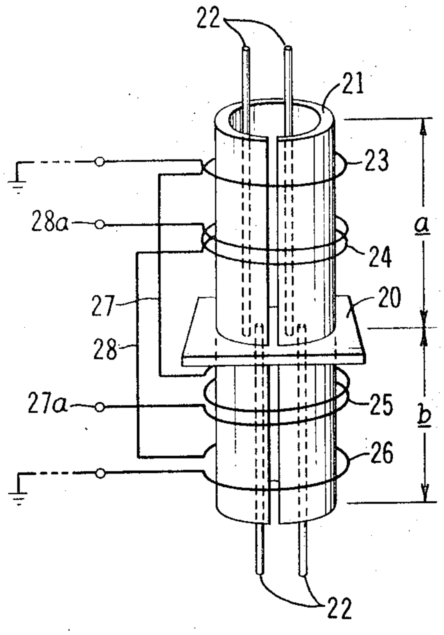
FIG. 2 depicts a ferreed device which may advantageously comprise the basic ferreed switching element at the crosspoints of the ferreed switch shown in FIG. 1 and of other ferreed switches employed in a specific embodiment of this invention.

A ferreed device there described may be briefly reviewed with particular reference to FIG. 2. A magnetically permeable collar 20 encircles a slotted magnetic sleeve 21, of material having substantially rectangular hysteresis characteristics, at approximately its midpoint and opposite contacts of magnetically responsive reed members 22 within the sleeve. Each portion of the sleeve 21 defined by the collar 20 has a pair of windings coupled thereto. The portion *a* of the sleeve 21 has a winding 23 and a winding 24 thereon and the portion *b* has a winding 25 and 26 thereon. The windings 23 and 24 are wound in the same sense on the sleeve 21 but in the opposite sense to the windings 25 and 26, which latter windings are also wound in the same sense. The winding 23 is connected in series opposing with the winding 25 in an energizing circuit 27 and the winding 24 is connected in series opposing with the winding 26 in an energizing circuit 28. The windings 23 and 26 each have a smaller number of turns than each of the windings 24 and 25 in order to achieve the differential excitation mode of operation which may now be briefly described.

Since this mode of operation, as is known, depends on the simultaneous energization of the two sets of control windings 23–24 and 25–26, it will be assumed that a positive current pulse is applied simultaneously to each of the circuits 27 and 28, specifically, to the respective terminals of these circuits designated 27*a* and 28*a*. From the sense of the windings 24 and 25 and the polarity of the applied energizing pulse a remanent magnetization will be induced responsive thereto in the sleeve 21 which is upward as viewed in the drawing. This magnetization will be equally distributed along the sleeve 21 and will find closure through the magnetic reed contact members 22 thereby effecting their closure. The energizing pulse will also be applied to the oppositely wound windings 23 and 26 thereby generating a counter magnetomotive force to the force inducing the foregoing magnetization. However, the number of turns of the latter windings is determined such that this magnetomotive force is overridden by the force generated in the windings 24 and 25 having a larger number of turns.

Release of the contacts is accomplished by applying an energizing current pulse to either one but not both of the energizing circuits 27 and 28. Assuming that such a positive current pulse is applied to only the circuit 27 at its terminal 27*a*, a magnetomotive force in the upward direction as viewed in the drawing will be generated by the winding 25 and such a force in the downward direction will be generated by the winding 23. In the portion *b* of the sleeve 21 to which the winding 25 is coupled, the magnetization is already upward as a result of the previously described operation, and accordingly no effective magnetic change takes place in this portion *b*. In the portion *a*, however, the previously induced magnetization is switched to the opposite direction. Since no energizing current pulse is being applied at this time to the circuit 28, no magnetomotive forces counter to those just described are generated in the windings 24 and 26. The flux closure of the oppositely directed magnetizations as a result of the single applied current pulse will now be through the shunting collar 20 and through single ones of the reed contact member pairs. As a result, the magnetic poles of the contacts of the members 22 will be alike, thus causing their separation. It will thus be seen that when only one of the energizing circuits 27 and 28 is energized, one of the portions *a* or *b* will have the magnetization switched therein depending upon which one of the circuits 27 and 28 has a current pulse applied thereto. It is obviously immaterial which one alone is thus energized since in either case the contacts will be opened. With this general review of prior art coordinate switch array and series ferreed device, an electronic control circuit according to this invention as applied to a switching network comprised of the above mentioned switch arrays may now be described.

Figure 3:
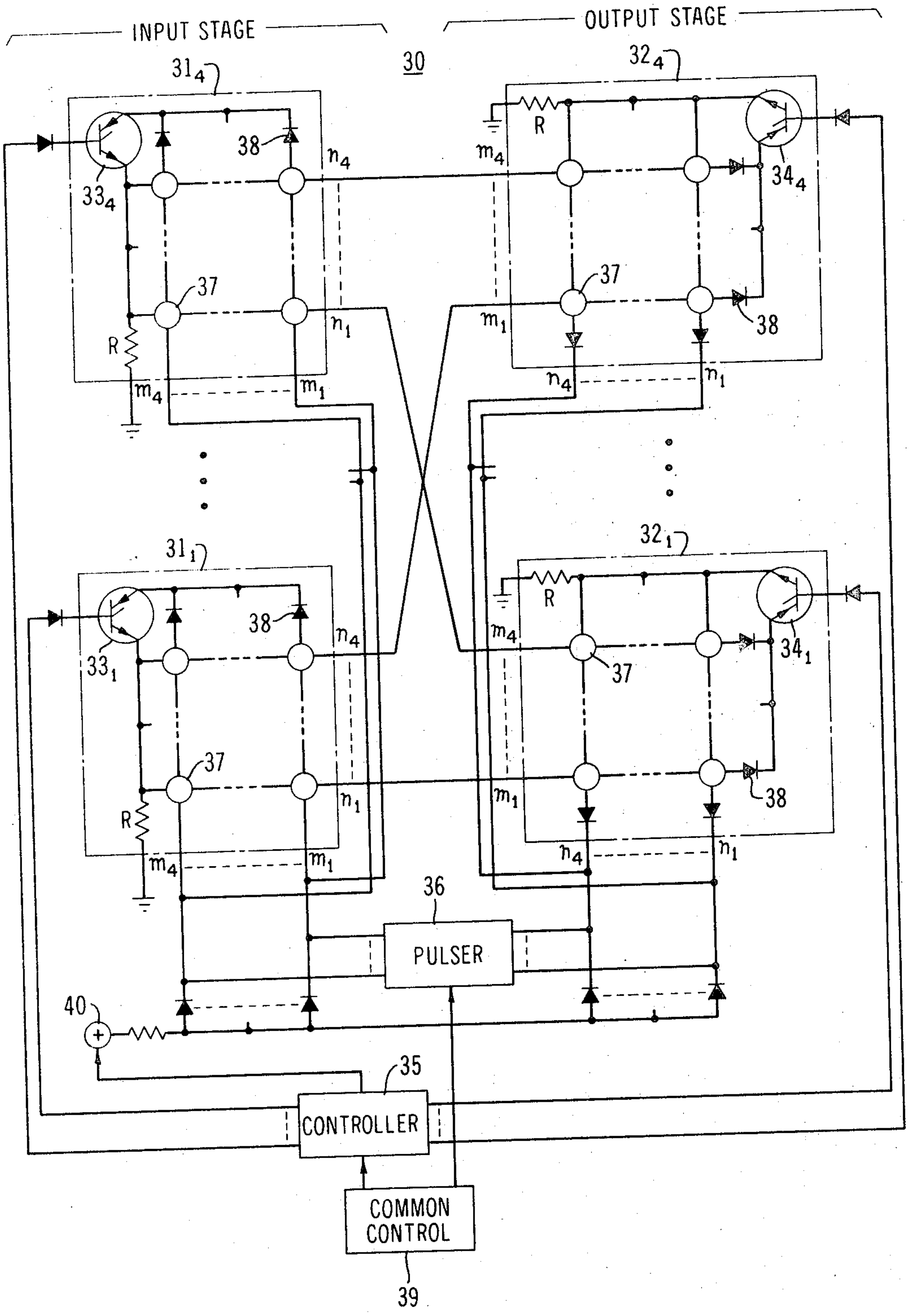
FIG. 3 depicts in simplified form a network grid incorporating the selection and network path control circuitry according to the principles of this invention.

FIG. 3 shows a grid arrangement of switches comprising an interconnection of four switches of a primary stage with four switches of a secondary stage, only representative terminal switches being shown in the drawing. The grid 30 of FIG. 3 is thus shown in only sufficient detail to understand its organization and the interstage connections and comprises in the primary stage switches $31_1$ through $31_4$. The secondary stage is similarly made up of switches $32_1$ through $32_4$. Each of the switches 31 and 32 comprises a switch as shown in FIG. 1 and previously described having at each of its crosspoints a ferreed device as shown in FIG. 2. Accordingly, the switches 31 and 32 also have *m* and *n* coordinate control conductors having connected in series therewith the respective control winding sets of the individual ferreeds shown in FIG. 2. The *m* coordinate control conductors of the grid 30 are grouped as a multiple of input control conductors $m_1$ through $m_4$ having access to every switch 31 in the input stage. The *n* coordinate control conductors are grouped as a multiple of output control conductors $n_1$ through $n_4$ having access to every switch 32 in the output stage.

The output control conductors *n* of the switches 31 are connected, respectively, to the input control conductors *m* of the switches 32. The coordinate transmission conductors (not shown) associated with the output control conductors *n* of the switches 31 may be connected to the coordinate transmission connectors (not shown) associated with the input control conductors *m* of the switches 32. These connections are made in a manner so that each of the primary stage switches 31 has access to all of the secondary stage switches 32.

In the grid arrangement of FIG. 3, a unique, continuous control path is available from any *m* input control conductor of the primary stage to any *n* output control conductor of the secondary stage. This unique control path is defined by selecting an *m* and *n* control conductor and by enabling a PNPN transistor 33 in the input stage and a PNPN transistor 34 in the output stage. Selection of particular switches 31 and 32 is accomplished by the enabling of the PNPN transistors 33 and 34 associated with the selected switches. This is accomplished by a controller 35 which receives and translates information, necessary to select the switches 31 and 33, from a common control 39. When, upon a command of the common control 39, a current pulse is applied to one of the selected *m* control conductors by a pulser 36 it will be conducted along a predetermined path specified by the selected *m* and *n* control conductors of the grid and the enabled switches 31 and 32 in the input and output stage, respectively. The controller 35, common control 39, and pulser 36 are shown in the drawing only in block symbol form and are considered here only in terms of their function and control signals generated thereby. The details of these circuits are well known in the art and, in any event, are not essential for a complete understanding of this invention.

In the control path, the current pulse will be simultaneously applied to the control winding sets of ferreed crosspoints. Energization of this control path initiates establishment of the paralleling transmission path as is known. Each of the unselected paths is blocked to the current pulse by the isolation diodes 38.

Even though FIG. 3 depicts a switching network comprised of only one grid 30, it will be appreciated that a telephone switching system, for example, would normally require a plurality of such grids. In the past, control of each selected PNPN transistor 33 and 34 has been dependent upon preceding and succeeding PNPN transistors in the control path having been enabled. Disadvantages of such an arrangement are readily apparent. Each selected PNPN transistor 33 or 34 is dependent upon previously selected PNPN transistors to provide a conductive path for its control current, thus each additional transistor in the control path has to have more drive to be applied to its gate electrode since each selected transistor contributes to the total impedance of the pulse path. Consequently, if the number of stages becomes large, integrated circuit technology, with its typically low power levels, will not be compatible with this type electronic control circuit. Another very serious problem may arise if any of the isolation diodes 38 are leaky or shorted. Whereas, the electromechanical control circuit utilizes relay contacts to provide substantially positive isolation of the selected pulse path from the unselected ones, should an isolation diode 38 become leaky or shorted, pulsing of the selected path may result in the destruction of an established transmission path or creation of an undesired transmission path. These problems are overcome and other advantages are achieved in accordance with this invention by the provision of an individual conductive path for the enabling current applied to gating electrodes of the PNPN transistors by addition of a resistor R between the cathode of each PNPN transistor and ground. The provision of such an individual conductive path for enabling current makes the control of a selected PNPN transistor 33 or 34 independent of the preceding or succeeding transistors in the pulse path since the control current supplied to the gating electrode of a PNPN transistor in a select stage should only see, if there are no defects in the network fabric of the grid 30, a path through the cathode resistor R of the selected PNPN transistor to ground. Thus, any number of select stages can be advantageously linked together and still be controlled with low power potentials available from integrated circuitry.

Another important advantage realized, by the addition of resistor R in the cathode circuit of the PNPN transistors 33 and 34, is that the integrity of the selected pulse path may be advantageously verified. The control current supplied to a gating electrode of a selected PNPN transistor sees only the resistor R in the cathode circuit of said transistor, thus its magnitude may be determined, in a manner well known to persons skilled in the art, by the potential applied to the gate electrode and the value of resistor R. Should any of the isolation diodes 38 become leaky or shorted, or should an addressing error cause more than one PNPN transistor to be enabled in the same select stage, additional cathode resistors R will establish one or more parallel paths to ground for said control current. In such an event the magnitude of the control current will deviate from the predetermined level and may enable appropriate circuitry in the controller 35 to generate a fault signal to common control 39.

If a test for shorted or leaky diodes, addressing errors, or open cathode resistors, does not indicate any faults, a further unique test to check the continuity of the pulse path may be advantageously made due to the presence of the cathode resistors R. A path sensing potential 40 may be applied under the control of the controller 35 simultaneously to the input and output ends of the selected pulse path. The path sensing current will see a path through the selected ferreed cross-points 37, isolation diodes 38, enabled PNPN transistors 33 and 34, and the cathode resistors R of the enabled transistors to ground. The current through the cathode resistors R of the enabled PNPN transistors, due to the path sensing potential applied to the pulse path, will reduce the magnitude of each of the control currents supplied to the enabled PNPN transistors. If there is continuity in the pulse path the path sensing current will reach a level that is determined by the number of resistors it sees. If, however, an open condition exists in the path, the path sensing current will be blocked at that point and the path sensing current will not reach the proper level. Failure of the path sensing current to reach the proper level will prevent the pulser 36 from firing and cause controller 35 to generate a fault signal to the common control 39.

Application of a positive potential 40 to the output end of the pulse path keeps it above ground potential during pulsing, thereby preventing enabling of unselected PNPN transistors which may occur should the cathode potential become negative with respect to ground.

What has been described is considered to be only an exemplary embodiment of this invention and it is to be understood that various and numerous other arrangements may be devised by one skilled in the art without departing from the spirit and scope of this invention as defined by the accompanying claims.

What is claimed is:

1. An electrical switch arrangement comprising a first and second plurality of intersecting coordinate conductors defining a coordinate array of crosspoints, a plurality of crosspoint switch devices associated with said first and second plurality of conductors at respective crosspoints, each of said devices being activatable by concurrent signals in the conductors of said first and second plurality of conductors defining its crosspoint, a first and a second common node for said first and second plurality of conductors, respectively, transistor means having an anode and a cathode connected to said first and second common nodes, respectively, and having a gate electrode adapted to have a control gating signal applied thereto, and circuit means for said control gating signal including a resistor connected between said second common node and a reference potential.

2. The electrical switch arrangement in accordance with claim 1 wherein said transistor means comprises a PNPN transistor.

3. The electrical switch arrangement in accordance with claim 1 wherein said circuit means further includes a control current source connected to said gating electrode.

4. The electrical switch arrangement in accordance with claim 3 wherein said reference potential is ground potential.

5. The electrical switch arrangement in accordance with claim 1 wherein a unilateral conductive element is connected in each of the conductors of said first plurality of conductors.

6. The electrical switch arrangement in accordance with claim 3 wherein the resistance value of said resistor is large compared with the impedance of any one of the conductors connected to said second common node.

7. In a communication system switching network having a plurality of coordinate crosspoint switches and a plurality of transistor circuits for selectively defining coordinate conducting paths through said switches, each transistor circuit including an anode terminal, a cathode terminal, and a control terminal, a signal source connected to said anode terminal through a first selected coordinate conducting path, a load circuit for said signal connected to said cathode terminal comprising a second selected coordinate conducting path, means for selectively applying a control signal to said control terminal, and a resistor connected between said cathode terminal and ground potential to provide a conducting path for said control signal.

8. The combination in accordance with claim 7 wherein the resistance value of said resistor is large compared with the impedance of said load circuit.

9. In combination, a transistor gate circuit comprising an anode terminal, a cathode terminal and a control terminal;

a signal source connected to said anode terminal, a load circuit for circuits from said signal source connected to said cathode terminal;

means for applying a control signal to said control terminal; and a resistor connected between said cathode terminal and a reference potential to provide a conducting path for said control signal.

10. The combination in accordance with claim 9 wherein said transistor gate circuit comprises a PNPN transistor.

11. The combination in accordance with claim 9 wherein said reference potential is ground potential.

12. The combination in accordance with claim 9 wherein said signal source is connected via a first plurality of conductors to said anode terminal, and said load circuit is connected via a second plurality of conductors to said cathode terminal.

13. The combination in accordance with claim 9 wherein the resistance value of said resistor is large compared with the impedance of said load circuit.

14. A switching network comprising a plurality of first stage switches, a plurality of second stage switches, each of said first and second stage switches comprising a first and a second plurality of intersecting coordinate conductors defining a coordinate array of crosspoints, a plurality of crosspoint devices electrically associated respectively with said first and second plurality of conductors at said crosspoints, and transistor means having an anode electrode, a cathode electrode, and a gate electrode, said first plurality of conductors having a common connection at one end with said anode electrode, said second plurality of conductors having a common connection at one end with said cathode electrode, each of the conductors of said second plurality of conductors of each of said first stage switches being individually connected to a conductor of said first plurality of conductors of a particular switch of said second stage switches;

means for establishing a single conducting path through said network comprising means for applying a first gating signal to the gating electrode of the transistor means of a selected switch of said first stage switches, and means for applying a second gating signal to the gating electrode of the transistor means of a selected switch of said second stage switches concurrently with said first gating signal; and a conducting path for said first and second gating signals including a resistor connected between the cathode of each of said transistor means of each of said first and second stage switches and ground.

15. The switching network in accordance with claim 14 wherein each of said crosspoint devices comprises differentially wound ferreed switches.

* * * * *